Figure 5:
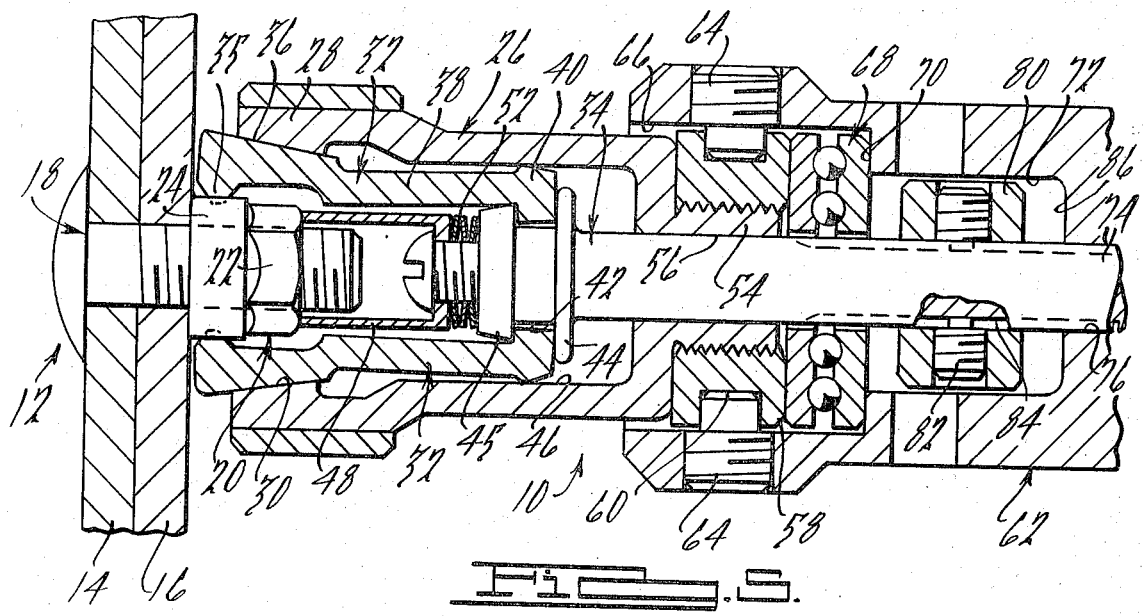

United States Patent [19]
Pinkerton

[11] 3,834,011
[45] Sept. 10, 1974

[54] METHOD OF SETTING A THREADED FASTENER

[75] Inventor: William E. Pinkerton, Dearborn Heights, Mich.

[73] Assignee: Huck Manufacturing Company, Detroit, Mich.

[22] Filed: Apr. 27, 1973

[21] Appl. No.: 355,174

Related U.S. Application Data

[63] Continuation of Ser. No. 112,746, Feb. 4, 1971, abandoned.

[52] U.S. Cl. ............... 29/517, 29/200 B, 29/240, 72/402, 81/10
[51] Int. Cl. .................. B21d 39/00, B23p 11/00
[58] Field of Search ............ 29/446, 452, 509, 428, 29/516, 517, 240, 200 B; 81/10; 72/402

[56] References Cited
UNITED STATES PATENTS

| | | | |
|---|---|---|---|
| 3,421,562 | 1/1969 | Orloff et al. | 29/517 X |
| 3,478,564 | 11/1969 | Hurd | 29/517 X |
| 3,603,132 | 9/1971 | Holmes | 29/517 X |
| 3,689,951 | 9/1972 | Van Hecke | 29/517 X |
| 3,653,802 | 4/1972 | Weiss | 29/240 X |

Primary Examiner—Charlie T. Moon
Attorney, Agent, or Firm—Harness, Dickey & Pierce

[57] ABSTRACT

A tool for driving and setting fasteners generally of the type shown in the United States Patent to Orloff et al. U.S. Pat. No. 3,421,562 issued Jan. 14. 1969.

6 Claims, 6 Drawing Figures

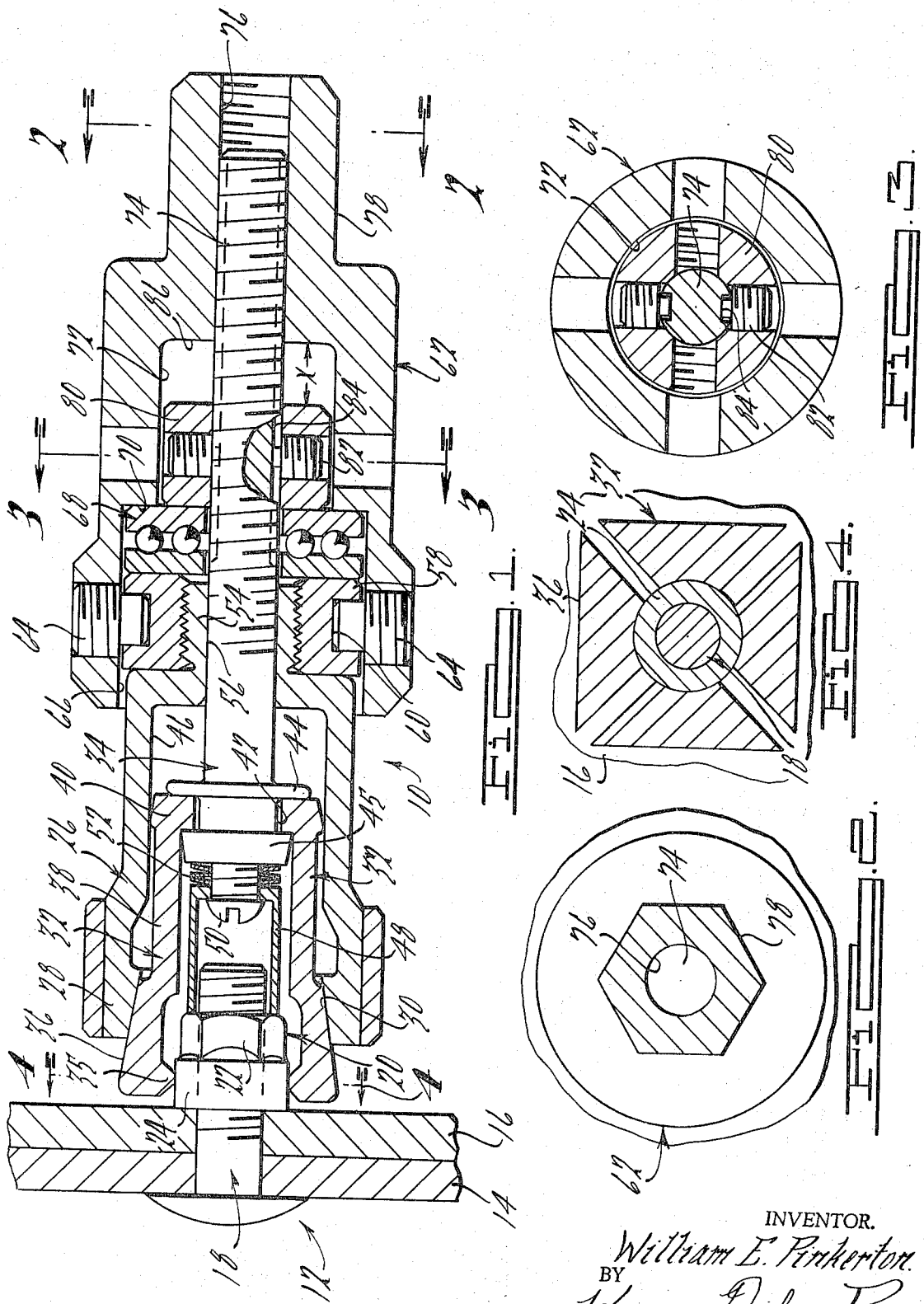

PATENTED SEP 10 1974  3,834,011

SHEET 2 OF 2

INVENTOR.
William E. Pinkerton
BY
Harness, Dickey & Pierce
ATTORNEYS

METHOD OF SETTING A THREADED FASTENER

This is a continuation of application Ser. No. 112,746, filed Feb. 4, 1971, now abandoned.

SUMMARY BACKGROUND OF THE INVENTION

The present invention relates to tools for setting fasteners and more particularly tools for setting fasteners by crimping.

In applying fasteners of the type shown in the above noted Orloff et al. patent a nut is first threaded onto a bolt member and then the nut is crimped to provide a fastened joint having desired pretensioning. In the present invention, a tool is provided which operates from a rotary drive and automatically torques and crimps the nut onto the bolt member all in response to a rotary input. Therefore, it is an object of the present invention to provide a tool which will automatically torque and crimp the nut onto the bolt in response to a rotary input.

In setting fasteners of the type noted, it is important that the torquing of the nut be completed prior to the nut being crimped into the threads or grooves of the bolt. In the present invention the application of a crimping force is held off generally by a force or load in the coupling structure which converts, in a sense, the rotary input torque into the torquing and crimping output. The magnitude of this force or load increases with the magnitude of the torque resulting in a tool which operates in a sequence of continuous steps alternating between nut torquing and nut crimping. As will be seen this is done with a tool having a relatively simple construction. Therefore, it is another object of the present invention to provide a tool of the above described type in which a force or load responsive coupling is used to sense input torque and to actuate crimping in response to the magnitude of the coupling load.

In the present invention the tool is provided with a plurality of crimping jaws which perform the crimping function; in addition in a preferred embodiment the jaws also grip the nut to perform the torquing function. Therefore, it is another object of the present invention to provide a tool of the above described type in which the jaws, which crimp the nut, also grip the nut for torquing.

The tool of the present invention can be used to drive and set a nut which has a generally uniform outer surface, i.e. an irregular surface such as a hex head is not required. Therefore it is another object of the present invention to provide a tool of the above described type which can set a fastener member which has a generally uniform outer surface.

It is another general object of the present invention to provide a new and improved tool for torquing and crimping fasteners.

Figure 6:
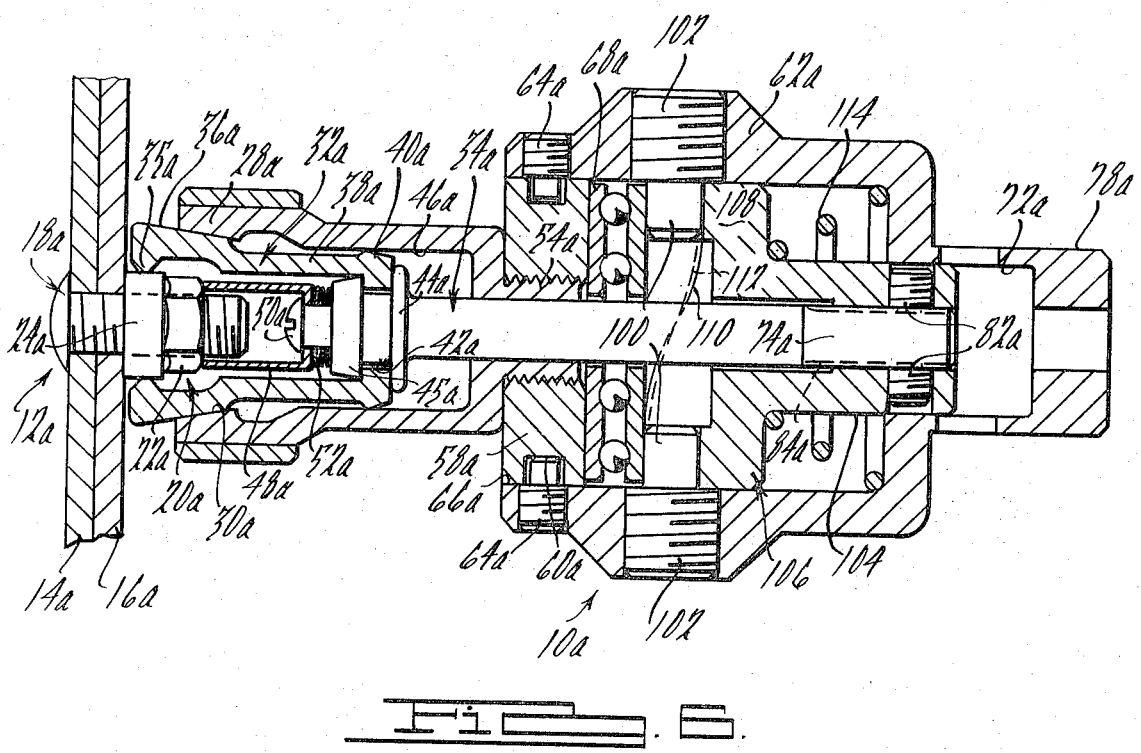

Other objects, features, and advantages of the present invention will become apparent from the subsequent description and the appended claims, taken in conjunction with the accompanying drawings, in which:

FIG. 1 is a longitudinal, sectional view of one form of a tool embodying features of the present invention;

FIGS. 2, 3 and 4 are sectional views of the tool of FIG. 1 taken substantially along the lines 2—2, 3—3 and 4—4 respectively in FIG. 1;

FIG. 5 is a fragmentary, sectional view of the tool of FIG. 1 depicting the tool in its crimping operation; and FIG. 6 is a longitudinal sectional view of a different form of a tool embodying features of the present invention.

Looking now to FIGS. 1-5, a tool assembly 10 is shown for setting a fastener assembly 12 which is used to secure together a pair of workpieces 14, 16. The fastener assembly 12 can be of the type shown and described in the above noted patent to Orloff et al and as such includes a threaded bolt 18 and a complementarily threaded nut 20. The nut 20 has an outer hex portion 22 and a rearward annular or uniform portion 24. The fastener assembly 12 is set, in accordance with the Orloff et al. patent (supra), by torquing the nut 20 onto the bolt 18 drawing the workpieces 14, 16 and then crimping the portion 24 radially inwardly to elongate the nut 20 and to thereby provide the desired pretensioning of the fastened joint. The torquing and crimping of the nut 20 is done by the tool 10.

The tool 10 has a generally bell shaped collet member 26 which terminates at its forward end in an enlarged diameter portion 28 having a plurality of slots 30. A plurality of separate, crimping jaws or fingers 32 are located in collet 26 and are supported on a draw bar 34 for reciprocable, longitudinal movement relative to the collet member 26. The jaws 32 terminate at their forward ends in radially inwardly extending and tapering teeth 35, which perform the crimping action on the nut 20. The jaws 32 have flat, tapered outer surface portions 36 which are located in the slots 30; the engaging, outer surface of slot 30 is of a shape which is complementary with the shape of the jaw surface portions 36. An elongated portion 38 connects the forward portion of jaws 32 with an enlarged terminating end section 40 which is of a generally rectangular shape. The end section 40 is located within a groove 42 defined at the forward end of draw bar 34 by a pair of spaced flanges 44 and 45. The groove 42 has a square cross section ad does the flange 45, in this way a rotary drive connection is provided between the draw bar 34 and the jaws 32. As can be seen from FIG. 1, the jaws 32 are radially positioned by the groove 42 and the internal, confronting surface 46 of the collet 26. With the structure as shown and described, as the collet 26 is moved forwardly relative to the draw bar 34 and jaws 32, the forward portion of the jaws 32 will be moved radially inwardly with the teeth 35 crimping the portion 24 of the nut 20. In order to properly position the teeth 35 of the jaws 32 over the nut portion 24, a cup shaped locating member 48 is held to the forward end of the draw bar 34 at a selected location by a bolt 50. A plurality of conical spring washers 52 hold the locating member 48 against the head of the bolt 50. The locating member 48 is of a size to fit over the shank of bolt 18 whereby its outer end engages the forward end of the nut 20; this positions the teeth 35 relative to the nut 20. The conical spring washers 52 permit the locating member 48 to move rearwardly relative to the draw bar 34 to compensate for elongation of the nut 20 resulting from crimping by the jaws 32.

The collet 26 terminates at its rearward end in a reduced diameter portion 54. The portion 54 has a through bore 56 through which the draw bar 34 extends and is guided for relative rotational and longitudinal motion. The portion 54 is externally threaded and is in threaded engagement with an annular retainer track member 58. The track member 58 has an annular groove or track 60 and is held from axial movement to a bell shaped drive housing 62 by a pair of threaded pins 64. The drive housing 62 has at its forward end an enlarged bore portion 66 which receives the track member 58. While the track member 58 is axially held via threaded pins 64 it can rotate relatively to the drive housing 62. A thrust bearing assembly 68 is located in the bore portion 66 between the track member 58 and a shoulder 70 which is defined by the juncture between the enlarged bore portion 66 and an intermediate bore portion 72. Thus relative axial thrust loads between the collet 26 and the jaws 32 (via the drive housing 62, in a manner to be seen) are reacted against the bearing assembly 68, and friction due to relative rotation of these components is minimized at this point of reaction.

The draw bar 34 is threaded at its rearward end 74 and this end is threadably secured to a reduced diameter threaded bore 76 located at the rearward end of the drive housing 62. The terminating outer surface 78 of the drive housing 62 is formed in a hex shape to facilitate engagement by a wrench or a socket fitting of a power tool (neither shown).

To utilize the tool 10 to apply the fastener assembly 12, the jaws 32 are located over the fastener assembly 12 generally as shown in FIG. 1 and torque is applied to the drive housing 62 via the hex end 78 by a rotatable power tool, for example. This will initially end to rotate the entire tool 10. However, either due to inertia or a slight amount of friction applied to the collet 26, e.g. as by the engagement of the locating member 48 against the nut 20, the drive housing 62 will rotate relative to the draw bar 34. This will result in the collet 26 moving fowardly relative to the draw bar 34 and hence forwardly relative to the jaws 32. As this occurs the jaws 32 will move radially inwardly in to engagement with the nut 20 whereby the nut 20 will be gripped. Note that the drive housing 62 will also rotate relative to the collet 26 via the rotatable coupling provided by threaded pins 64 in groove 60 of track member 58. As the jaws 32 grip the nut 20 the force required to rotate the draw bar 34 relative to the drive housing 62 will increase resulting in the entire tool 10 again rotating in unison while at the same time the nut 20 is threaded onto the bolt 18. As the nut 20 is tightened against the workpiece 16 the torque required to further turn the nut 20 increases; at the same time the input torque at the hex end 78 increases sufficiently to overcome the load at the threaded connection between draw bar portion 74 and bore 76 and again the drive housing 62 will be rotated relative to the remainder of the assembly resulting in the jaws 32 further crimping into the nut 20. As the crimping load on the threaded connection increases and rotation between draw bar 34 and drive housing 62 ceases the input torque increases further and the tool 10 will again turn in unison and the nut 20 will be additionally torqued onto the bolt 18.

The sequence will continue until the torque required to rotate the nut 20 onto the bolt 18 is higher than that required to rotate the drive housing 62 relative to the draw bar 34, e.g. after the material of the nut 20 is crimped into the threads of the bolt 18. At this time any additional input torque will result in further crimping action since now the torque required to rotate the nut 20 onto the bolt 18 further has increases sharply and greatly exceeds that torque required to rotate the drive housing 62 relative to the draw bar 34. This latter rotation will continue until final crimp occurs. The extent or depth of final crimp is controlled by the amount of relative longitudinal movement between the draw bar 34 and the drive housing 62; this is selectively, adjustable by means of an annular stop bushing 80. The bushing 80 is threadably secured to the threaded draw bar portion 74 within the intermediate bore portion 72. The position of bushing 80 can be adjusted by means of set screws 82 locatable in longitudinally extending slots 84 in the threaded draw bar portion 74. The extent that the jaws 32 are moved inwardly to their crimp position will be set by the selective location of the bushing 80 on the draw bar 34, i.e. when the bushing 80 engages the rearward wall 86 of the intermediate bore portion 72. Conversely, the maximum open position of the jaws 32 will be reached when the bushing 80 engages thrust bearing 68. As can be seen the total motion of the jaws 32 will be determined by the distance X, total travel of bushing 80. This distance X, and hence the total motion of jaws 32, can be varied by varying the width of bushing 80.

It is significant to note that the tool 10 performs both torquing and crimping functions and in the form of the tool shown in FIG. 1 both functions are performed by the crimping jaws 32. This dual function occurs as a result of a balance between the torque required to thread the threaded draw bar portion 74 into the threaded bore 76 and the torque required to thread the nut 20 onto the bolt 18. In this regard the mechanical advantage or pitch of the threads on draw bolt portion 74 can be selected such as to facilitate the torquing and crimping action without excessive frictional losses at its threaded connection with drive housing 62. Generally the torque required to turn the draw bar 34 will be determined by the load taken through its threaded connection with the drive housing 62; this load, however, does not remain constant but will increase as the nut 20 is torqued and crimped. This responsiveness to increasing load actually assists the tool 10 in performing its dual function. Thus the jaws 32 move into engagement with the nut portion 24 further inward motion of the jaws 32 is resisted and the axial load on the threaded connection of the draw bar 34 to the drive housing 62 increases, resulting in an increase in the level of torque required to rotate the draw bar 34 in the bore 76. Now the tool 10 will rotate in unison and the nut 20 will be rotated on the bolt 18. This mode of operation will continue until the torque required to rotate the nut 20 increases, i.e. as when the nut 20 engages the workpiece 16. When the torque to turn the nut 20 exceeds that required to turn the drive housing 62 on the draw bar 34, then the drive housing 62 will be rotated on draw bar 34 and the jaws 32 will advance further radially inwardly to crimp the nut 20 to a greater extent. The increased crimping will require greater torque and will increase the axial load on the threaded connection between draw bar 34 and drive housing 62. This increased torque when it exceeds that required to rotate the nut 20 will result in a further tightening of the nut 20 on the bolt 18 until the torque required to tighten the nut 20 exceeds that required to rotate the drive housing 62 on the draw bar 34. The above sequence of events continues until the material of the nut 20 is initially crimped into the threads of the nut 18; at this point, the torque required to rotate the nut 20 increases sharply and further rotation of the nut 20 is stopped. Now the tool 10 functions substantially solely in a crimping mode with the drive housing 62 turning on the draw bar 34 until the stop bushing 80 engages the wall 86. The crimping operation is now completed and the torquing of the tool 10 is discontinued. The tool 10 can be torqued by hand or can be torqued by means of a power torquing tool of a type known in the art; where a power tool is used a torque limiting clutch could be provided to prevent over-torquing of the tool 10 by limiting the input torque to a selected value just in excess of the maximum required for the crimping operation.

It is important to note that the tool 10 while operating in two different modes does so almost in a step fashion with the threaded connection between the draw bar 34 and the drive housing 62, in a sense, acting as a switch which is responsive to the magnitude of the torque load such that the tool 10 will be switched between the nut torquing and crimping mode with the torque at which crimping occurs being automatically varied with the input force or torque. Note also that in either mode the jaws 32 are actuated via the draw bar 34, i.e. either pulled by the draw bar 34 or rotated by the draw bar 34 via connection at flanges 44, 45 and slot 42.

As noted the jaws 32 of the tool 10 grip the nut 20 on the uniform portion 24 and apply torque therethrough. To facilitate initial gripping it may be desirable in some applications to roughen, or otherwise provide a surface finish having a relatively high coefficient of friction, on the uniform portion 24. With this structure then, the tool 10 can be used to set fasteners in which the torqued member such as nut 20, is completely of a uniform structure, i.e. no flats are required, such as hex portion 22.

In FIG. 6 a tool 10a is shown which is of a modified form embodying features of the present invention. In the description of the tool 10a of FIG. 6 components similar to like components of the tool 10 of FIGS. 1–5 have been given the same numerical designation with the addition of the letter postscript a.

The tool 10a has a collet member 26a with crimping jaws or fingers 32a located therein (similar to tool 10 of FIGS. 1–5) and are supported on a draw bar 34a. A cup shaped locating member 48a positioned teeth 35a relative to the nut 20a, while conical spring washers 52a permit the locating member 48a to move rearwardly relative to the draw bar 34a to compensate for elongated of the nut 20a resulting from crimping.

Collet 26a terminates at its rearward end in a reduced diameter portion 54a which has a through bore 56a through which the draw bar 34a extends and is guided. The portion 54a is in threaded engagement with a retainer track member 58a. Track member 58a has an annular groove or track 60a and is held from axial movement within an enlarged bore portion 66a of a bell shaped drive housing 62a by a pair of threaded pins 64a whereby the track member 58a can rotate relatively to the drive housing 62a. A thrust bearing assembly 68a is located between the track member 58a and a pair of cam rollers 100 which extend radially into the housing 62a. Rollers 100 are rotatably supported on screw members 102.

The draw bar 34a is threaded at its rearward end 74a and this end is threadably secured to a reduced diameter portion 104 at the rearward end of a cam member 106. The cam member is of a stepped construction and has an enlarged portion 108 slidably supported in bore 66a and has reduced diameter portion 104 slidably supported in reduced diameter portion 72a.

The cam 106 has a pair of similar cam surfaces 110 and 112, each of which extends for approximately 180°. The cam surfaces 110 and 112 engage the rollers 100 and as the drive housing 62a rotates relative to the draw bar 34a, the cam 106 is moved axially rearwardly along with the draw bar 34a. This of course causes the jaws 32a to move radially inwardly to crimp the nut 20a. As with the embodiment of FIGS. 1–5, the tool of FIG. 6 also functions such that the jaws 32a perform both the torquing and crimping functions in recurring steps. Thus initially the jaws 32a are closed upon the nut 20a as the rollers 100 move relatively easily partially along the cam surfaces 110, 112 with the drive housing 62a rotating relatively to the draw bar 34a (and cam 106). At this point the torque required for further relative rotation will increase until a level of torque is reached at which the nut 20a will be rotated onto the bolt 18a and at this time the tool 10a will rotate in unison. Eventually the torque required to tighten the nut 20a will increase, i.e. as it engages the workpiece 16a, and the rollers 100 will be rotated farther along the cam surfaces 110 and 112 with the drive housing 62a rotating relative to the draw bar 34a. This will result in further crimping action by the jaws 32a which increase the axial load on the cam and hence increases the torque required to move the rollers 100 along the cam surfaces 110 and 112. Further torquing of the nut 20a can occur and the sequence can repeat until the jaws 32a crimp the material of the nut 20a into the threads of the bolt 18a; at this time the torque required to rotate the nut 20a on the bolt 18a rises sharply and the tool 10a operates now solely in the crimping mode. The crimping will continue until the rollers 100 pass the crest of the cam surfaces 110 and 112. At this time the tool 10a will return to its original position as shown in FIG. 6; a light return spring 114 urges the cam 106 to its original position. In this regard the tool 10a is self releasing, i.e. no reverse torque is required to remove it from the fastener.

The tool radial travel of the jaws 32a is controlled by the total rise of the cam surfaces 110, 112. The initial jaw opening and the maximum depth of crimp is determined by the relative position at which the draw bar 34a is fixed to the cam 106. This position is adjustably selected by the threaded connection of draw bar portion 74a in cam portion 104; the selected position is fixed via set screws 82a which are threaded into cam portion 104 and engage axial slots 84a in draw bar portion 74a.

The cam angle or rise of the cam surfaces 110 and 112 is selected to balance with the torque required to torque the nut 20a onto the bolt 18a in manner similar to the selection of the balance between the threaded connection of tool 10 of FIGS. 1–5. The tool 10a has a portion 78a having a hex shape to facilitate gripping by a suitable hand or power tool.

While it will be apparent that the preferred embodiments of the invention disclosed are well calculated to fulfill the objects above stated, it will be appreciated that the invention is susceptible to modifications, variations and change without departing from the proper scope or fair meaning of the invention.

I claim:

1. The method of setting a fastener with includes a male and female member adapted to be threaded together with one of the members having a generally uniform, cylindrical surface means for being gripped, comprising the steps of: gripping the one member on its uniform surface means with the jaw means of a tool to effect said gripping, rotating the one member to thread it relatively to the other by rotating the jaw means, and continuously moving said jaw means radially inwardly in an interreacting actuation to torque and alternately crimp said one member at its uniform cylindrical surface means.

2. The method of providing a fastened joint which includes male and female threaded members connected together with a desired pretension and with one of the members having a generally uniform cylindrical surface means for being gripped, comprising the steps of: gripping the one member on its uniform surface means with the jaw means of a tool to effect said gripping, rotating the one member to thread it relatively to the other by rotating the jaw means, and generally continuously moving the same said jaw means radially inwardly to crimp the one member at its uniform surface and form said desired pretension.

3. The method of claim 1 wherein,
said jaw means are actuable for alternately gripping and crimping said one of the members.

4. The method of claim 3 wherein,
said jaw means are actuable for alternately gripping and crimping said one of the members.

5. The method of claim 1 wherein,
said jaw means are comprised of four separate jaw member elements operative to torque and finally crimp said one member.

6. The method of claim 2 wherein,
said jaw means are comprised of four separate jaw member elements operative to torque and finally crimp said one member.

* * * * *

UNITED STATES PATENT OFFICE
CERTIFICATE OF CORRECTION

Patent No. 3,834,011            Dated September 10, 1974

Inventor(s) William E. Pinkerton

It is certified that error appears in the above-identified patent and that said Letters Patent are hereby corrected as shown below:

Column 3, line 29, "end" should be --tend--. Column 5, line 49, "elongated" should be --elongation--. Column 6, line 44, "tool" should be --total--; line 56, after "in" insert --a--. Claim 4, column 8, line 8, "3" should be --2--.

Signed and sealed this 24th day of December 1974.

(SEAL)
Attest:

McCOY M. GIBSON JR.
Attesting Officer

C. MARSHALL DANN
Commissioner of Patents